(12) United States Patent
Kim et al.

(10) Patent No.: US 10,406,886 B2
(45) Date of Patent: Sep. 10, 2019

(54) HEAT MANAGEMENT SYSTEM FOR VEHICLE

(71) Applicant: Hanon Systems, Daejeon (KR)

(72) Inventors: Doo Hoon Kim, Daejeon (KR); Young Hum Han, Daejeon (KR); Chul Hee Kim, Daejeon (KR); Hyeon Gyu Kim, Daejeon (KR); Joong Man Han, Daejeon (KR); Kyung Ju An, Daejeon (KR); Jung Won Cho, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 49 days.

(21) Appl. No.: 15/405,635

(22) Filed: Jan. 13, 2017

(65) Prior Publication Data
US 2017/0197488 A1 Jul. 13, 2017

(30) Foreign Application Priority Data

Jan. 13, 2016 (KR) .................. 10-2016-0004106
Jun. 8, 2016 (KR) .................. 10-2016-0071173

(51) Int. Cl.
*H01M 10/6569* (2014.01)
*B60H 1/00* (2006.01)
(Continued)

(52) U.S. Cl.
CPC ...... *B60H 1/00278* (2013.01); *H01M 10/625* (2015.04); *H01M 10/6569* (2015.04);
(Continued)

(58) Field of Classification Search
CPC ............ B60H 1/00278; B60H 1/00385; B60H 1/00885; B60H 1/143; B60H 1/323;
(Continued)

(56) References Cited

U.S. PATENT DOCUMENTS

2014/0374060 A1* 12/2014 Labaste Mauhe .......................... B60H 1/00278
165/62
2015/0273981 A1 10/2015 Kang et al.
2016/0344075 A1* 11/2016 Blatchley .............. H01M 10/66

FOREIGN PATENT DOCUMENTS

CN 104949385 A 9/2015
KR 10-2015-0026176 3/2015

* cited by examiner

*Primary Examiner* — Stewart A Fraser
*Assistant Examiner* — Victoria H Lynch
(74) *Attorney, Agent, or Firm* — Norton Rose Fulbright US LLP; James R. Crawford

(57) ABSTRACT

A battery temperature control device for a vehicle, which heats the interior of the vehicle and a battery, and an air conditioner for a vehicle having same, the battery temperature control device including: a refrigerant circulation line (R) having a compressor (110), an indoor heat exchanger (130), expansion means (140, 150) and an outdoor heat exchanger (120); a coolant circulation line (W) which circulates a heater core (240) mounted to heat the interior of the vehicle; and a coolant heat exchanger (220) mounted to exchange heat between refrigerant circulating the refrigerant circulation line (R) and coolant circulating the coolant circulation line (W). Battery (210) is arranged on the coolant circulation line (W). The coolant circulation line which can heat the interior of the vehicle and the battery at the same allowing the battery temperature control device and the air conditioner heat the vehicle's interior and the battery effectively.

12 Claims, 11 Drawing Sheets

(51) Int. Cl.
  *H01M 10/625* (2014.01)
  *H01M 10/663* (2014.01)
  *B60H 1/14* (2006.01)
  *B60H 1/32* (2006.01)

(52) U.S. Cl.
  CPC ....... *H01M 10/663* (2015.04); *B60H 1/00385* (2013.01); *B60H 1/00885* (2013.01); *B60H 1/143* (2013.01); *B60H 1/323* (2013.01); *B60H 2001/00307* (2013.01); *B60H 2001/3279* (2013.01); *H01M 2220/20* (2013.01)

(58) Field of Classification Search
  CPC . B60H 2001/00307; B60H 2001/3279; H01M 10/625; H01M 10/6569; H01M 10/663; H01M 2220/20
  See application file for complete search history.

PRIOR ART

HEAT MANAGEMENT SYSTEM FOR VEHICLE

This application claims priority from Korean Patent Application Nos. 10-2016-0004106 filed on Jan. 13, 2016 and 10-2016-0071173 filed on Jun. 8, 2016, which are hereby incorporated by reference in their entireties.

BACKGROUND OF THE INVENTION

Field of the Invention

The present invention relates to a battery temperature control device for a vehicle and an air conditioner for a vehicle having the same, and more particularly, to a battery temperature control device for a vehicle, which heats the interior of the vehicle and a battery, and an air conditioner for a vehicle having the same.

Background Art

Recently, besides vehicles each of which uses a combustion engine, environmentally friendly vehicles which consider fuel efficiency, namely, hybrid vehicles or electric cars, are being actively developed around the world.

The hybrid vehicles are driven by power sources of two kinds, that is, the existing engine and a motor driven by electric power, and the electric cars are driven only by the motor driven by electric power. Such hybrid vehicles and electric cars are upcoming alternative vehicles which are in the limelight in the United States and Japan due to reduction of environmental pollution by exhaust gas and improvement of fuel efficiency.

Such a hybrid vehicle or electric car requires a high-capacity battery, and the high-capacity battery serves to supply electric power to the motor if needed and recharge electric energy generated from a regenerative power source when the vehicle decelerates or stops.

Such a high-capacity battery is not influenced by temperature. That is, within a specific range, efficiency of the battery increases because the higher temperature of the battery, the more a charge amount and a discharge amount. On the other hand, if the outdoor temperature is low in winter season, because temperature of the battery goes down, charging and discharging efficiencies become low, battery capacity and output are reduced, and the vehicle does not start in a severe case.

In order to solve the above problems, a battery heating device keeps the battery over predetermined temperature.

FIG. 1 is a schematic diagram of a conventional heat pump system for a vehicle. As shown in FIG. 1, the conventional heat pump system for a vehicle includes a compressor 30, a high-pressure heat exchanger 32, a first expansion valve 34, a first bypass valve 36, an outdoor heat exchanger 48, a low-pressure heat exchanger 60, an accumulator 62, an indoor heat exchanger 50, a second expansion valve 56 and a second bypass valve 58.

The compressor 30 functions to compress and discharge refrigerant, and the high-pressure heat exchanger 32 radiates heat of refrigerant discharged from the compressor 30. The first expansion valve 34 and the first bypass valve 36 are mounted in parallel to selectively allow a flow of refrigerant passing through the high-pressure heat exchanger 32, and the outdoor heat exchanger 48 heat-exchanges the refrigerant passing through the first expansion valve 34 or the first bypass valve 36 outdoors. Moreover, the low-pressure heat exchanger 60 evaporates the refrigerant passing through the outdoor heat exchanger 48, and the accumulator 62 divides the refrigerant passing through the low-pressure heat exchanger 60 into vapor-phase refrigerant and liquid-phase refrigerant.

Furthermore, the indoor heat exchanger 50 exchanges heat between refrigerant supplied to the low-pressure heat exchanger 60 and refrigerant returning to the compressor 30, the second expansion valve 56 selectively expands refrigerant supplied to the low-pressure heat exchanger 60, and the second bypass valve 58 is mounted in parallel with the second expansion valve 56 to selectively connect an outlet of the outdoor heat exchanger 48 and an inlet of the accumulator 62 with each other. The high-pressure heat exchanger 32 and the low-pressure heat exchanger 60 are embedded in an air-conditioning case 10, and the air-conditioning case 10 includes a temp door 12 for adjusting a mixing amount of cold air and warm air and a blower 20 mounted at an inlet of the air-conditioning case 10.

The conventional air conditioner has a disadvantage in that it can be operated only when a cooler is used because the air conditioner requires refrigerant of the cooler as a heat source for heating the battery. Particularly, the conventional air conditioner is inefficient because it needs heating of the battery in winter when people do not want cooling of the vehicle.

CITED REFERENCES

Patent Documents

Patent Reference 1: Korean Patent Publication No. 10-2015-0026176 published on Mar. 11, 2015

SUMMARY OF THE INVENTION

Accordingly, the present invention has been made in view of the above-mentioned problems occurring in the prior art, and it is an object of the present invention to provide a battery temperature control device for a vehicle, in which a heater core for heating a battery and the interior of the vehicle is mounted on a coolant circulation line formed separately from a refrigerant circulation line in order to heat the interior of the vehicle and the battery at the same time, and an air conditioner for a vehicle having the same.

To accomplish the above object, according to the present invention, there is provided a battery temperature control device for a vehicle including: a refrigerant circulation line having a compressor, an indoor heat exchanger, expansion means and an outdoor heat exchanger; a coolant circulation line which circulates a heater core mounted to heat the interior of the vehicle; a coolant heat exchanger mounted to exchange heat between refrigerant circulating the refrigerant circulation line and coolant circulating the coolant circulation line; and a battery is arranged on the coolant circulation line.

In another aspect of the present invention, there is provided an air conditioner for a vehicle including: a refrigerant circulation line including a compressor for compressing and discharging refrigerant, an indoor heat exchanger which is mounted inside an air-conditioning case to exchange heat between the refrigerant and air flowing inside the air-conditioning case, an outdoor heat exchanger which is mounted outside the air-conditioning case to exchange heat between the refrigerant and outdoor air, first expansion means which is mounted at an inlet of the indoor heat exchanger to expand the refrigerant supplied to the indoor heat exchanger, and second expansion means which is mounted at an inlet of the outdoor heat exchanger to expand the refrigerant supplied to the outdoor heat exchanger; a coolant circulation line for circulating a heater core mounted to heat the interior of the vehicle; a coolant heat exchanger mounted to exchange heat between the refrigerant circulating the refrigerant circulation line and the coolant circulating the coolant circulation line; and a battery is arranged on the coolant circulation line.

In the above, the battery may be connected to the coolant circulation line in parallel.

As described above, the present invention can efficiently heat the interior of the vehicle and the battery due to the coolant circulation line which can heat the interior of the vehicle and the battery at the same time.

Additionally, because the coolant circulation line is formed separately from the refrigerant circulation line, the refrigerant circulation line can carry out the cooling and heating modes in vehicles of various kinds.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
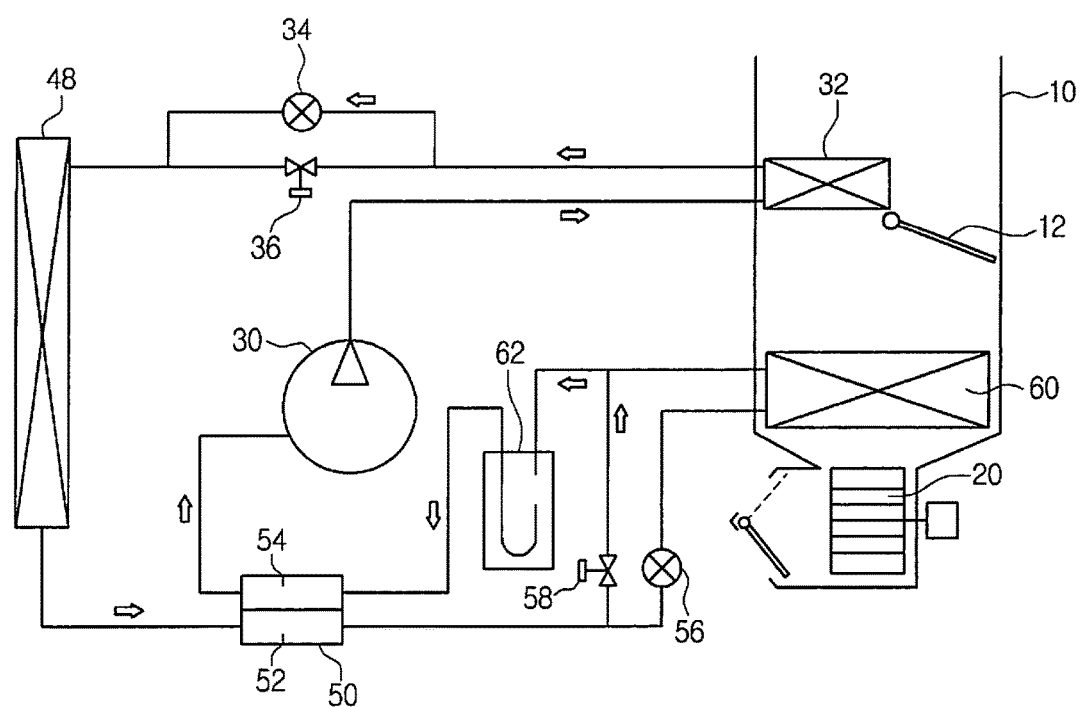
FIG. 1 is a configurative diagram of a conventional battery temperature control device for a vehicle.

Hereinafter, exemplary embodiments of the present invention will be described with reference to the accompanying drawings.

An air conditioner 100 for a vehicle according to the technical idea of the present invention includes a battery temperature control device 200 for a vehicle, and is applicable to vehicles of all kinds, such as hybrid vehicles, electric cars and vehicles using high-capacity batteries.

The air conditioner 100 for a vehicle is an apparatus for cooling or heating the interior of the vehicle, and the battery temperature control device 200 for a vehicle heats a battery 210 using refrigerant which circulates along a refrigerant circulation line R of the air conditioner 100 for a vehicle.

A compressor 110, an outdoor heat exchanger 120, an indoor heat exchanger 130 and expansion means 140 and 150 are mounted in the refrigerant circulation line R.

The compressor 110 compresses and discharges refrigerant, the indoor heat exchanger 130 is mounted inside an air-conditioning case 160 to exchange heat between the refrigerant and air flowing inside the air-conditioning case 160, and the outdoor heat exchanger 120 is mounted outside the air-conditioning case 160 to exchange heat between the refrigerant and outdoor air. The expansion means 140 and 150 include: a first expansion means 140, which is mounted at an inlet of the indoor heat exchanger 130 to expand refrigerant supplied to the indoor heat exchanger 130; and a second expansion means 140, which is mounted at an inlet of the outdoor heat exchanger 120 to expand refrigerant supplied to the outdoor heat exchanger 120.

Moreover, an accumulator 170 which divides the refrigerant into vapor-phase refrigerant and liquid-phase refrigerant may be mounted on the refrigerant circulation line R at the inlet of the compressor 110.

Furthermore, a coolant heat exchanger 220 which exchanges heat between the refrigerant and coolant circulating a coolant circulation line W is mounted on the refrigerant circulation line R. The coolant heat exchanger 220 is mounted on the refrigerant circulation line R and the coolant circulation line W to exchange heat between the refrigerant and the coolant. The coolant heat exchanger 220 may have one of various forms to exchange heat between the refrigerant and the coolant.

Additionally, a first bypass line R1 which bypasses the coolant heat exchanger 220 and the second expansion means 150 is formed. The first bypass line R1 is connected with the refrigerant circulation line R in parallel, and makes the refrigerant bypass the coolant heat exchanger 220 and the second expansion means 150 using a valve. Therefore, the refrigerant circulates the compressor 110, the outdoor heat exchanger 120, the first expansion means 140 and the indoor heat exchanger 130 in order.

In addition, a second bypass line R2 is formed to bypass the first expansion means 140 and the indoor heat exchanger 130. The second bypass line R2 is connected in parallel with the refrigerant circulation line R and allows the refrigerant to bypass the first expansion means 140 and the indoor heat exchanger 130 by a valve. Therefore, the refrigerant circulates the compressor 110, the coolant heat exchanger 220, the second expansion means 150 and the outdoor heat exchanger 120 in order.

Moreover, a chiller 190 which heat-exchanges waste heat supplied from electronic units 180 of the vehicle is mounted on the second bypass line R2. The chiller 190 is configured to exchange heat between the coolant, which circulates the electronic units 180 of the vehicle, and the refrigerant.

Furthermore, a dehumidification line D may be further formed to supply some of the refrigerant to the indoor heat exchanger 130 from the second bypass line R2. Accordingly, some of the refrigerant may be supplied toward the indoor heat exchanger 130 through the dehumidification line D using a valve mounted on the second bypass line R2.

Additionally, a third bypass line R3 may be further formed so that the refrigerant passing through the second expansion means 150 bypasses the outdoor heat exchanger 120. The third bypass line R3 is connected with the refrigerant circulation line R in parallel, and a valve is connected to the third bypass line R3 to allow the refrigerant to bypass the outdoor heat exchanger 120.

A heater core 240, a coolant heater 230 and a coolant pump 250 are disposed on the coolant circulation line W on which the coolant heat exchanger 220 is mounted.

The coolant heat exchanger 220, the coolant heater 230, the heater core 240, the coolant pump 250 and the battery 210 may be arranged on the coolant circulation line W in order. Therefore, the coolant circulates along the coolant circulation line W while passing through the coolant heat exchanger 220, the coolant heater 230, the heater core 240, the coolant pump 250 and the battery 210.

In this instance, the coolant heat exchanger 220 is mounted to exchange heat between the refrigerant discharged from the compressor 110 and the coolant passing through the battery 210. The battery 210 is connected to the coolant circulation line W, and preferably, is arranged between the coolant heat exchanger 220 and the coolant pump 250.

The coolant heater 230 is mounted to heat the coolant using electricity. The heater core 250 is mounted inside the air-conditioning case 160 to heat the interior of the vehicle. That is, the coolant heater 230 is mounted inside the air-conditioning case 160 together with the indoor heat exchanger 130. The coolant pump 250 is mounted to circulate the coolant along the coolant circulation line W.

In this instance, the coolant is heat-exchanged with refrigerant of high temperature in the coolant heat exchanger 220 and is additionally heated by the coolant heater 230, and the heater core 240 supplies heat to the interior of the vehicle through such heated coolant.

FIGS. 2 to 6 show various cooling and heating modes of the air conditioner 100 for a vehicle, but they are exemplary and other various forms of the cooling and heating modes of the air conditioner 100 are possible. In the drawings, parts indicated by solid lines are lines where refrigerant and coolant are circulated, and parts indicated by dotted lines are lines where refrigerant and coolant are not circulated.

Figure 2:
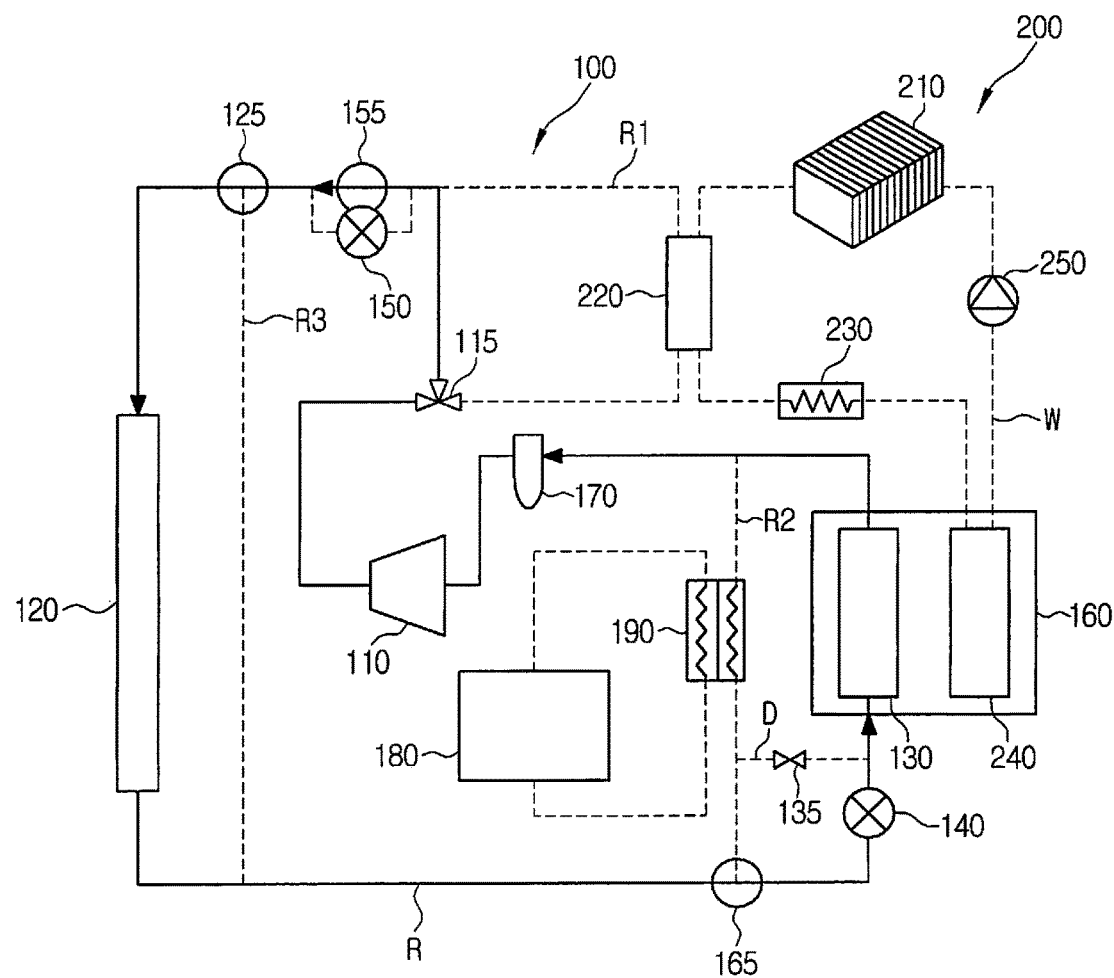
FIG. 2 is a configurative diagram showing a cooling mode of an air conditioner for a vehicle having a battery temperature control device for a vehicle according to a first preferred embodiment of the present invention.

FIG. 2 is a configurative diagram showing a cooling mode of the air conditioner 100 for a vehicle having the battery temperature control device 200 for a vehicle according to a preferred embodiment of the present invention.

The refrigerant passes through the compressor 110, the outdoor heat exchanger 120, the first expansion means 140, the indoor heat exchanger 130 and the accumulator 170, and then, is circulated to the compressor 110. In this instance, because the outdoor heat exchanger 120 plays a role as a condenser and the indoor heat exchanger 130 plays a role as an evaporator, the indoor heat exchanger 130 exchanges heat with the inside air of the air-conditioning case 160 to supply cold air to the interior of the vehicle.

In this instance, the refrigerant flows along the first bypass line R1 by a first valve 115 and a second valve 155 mounted on the refrigerant circulation line R after passing through the compressor 110, and then, bypasses the coolant heat exchanger 220 and the second expansion means 150. The first valve 115 is formed in a three-way valve type and is opened to make the refrigerant passing through the compressor 110 flow to the refrigerant circulation line R or the first bypass line R1. The second valve 155 is formed in a two-way valve type and is opened to make the refrigerant pass through or bypass the second expansion means 150.

Finally, the interior of the vehicle is cooled and the battery is not heated because the coolant circulation line W does not operate.

Figure 3:
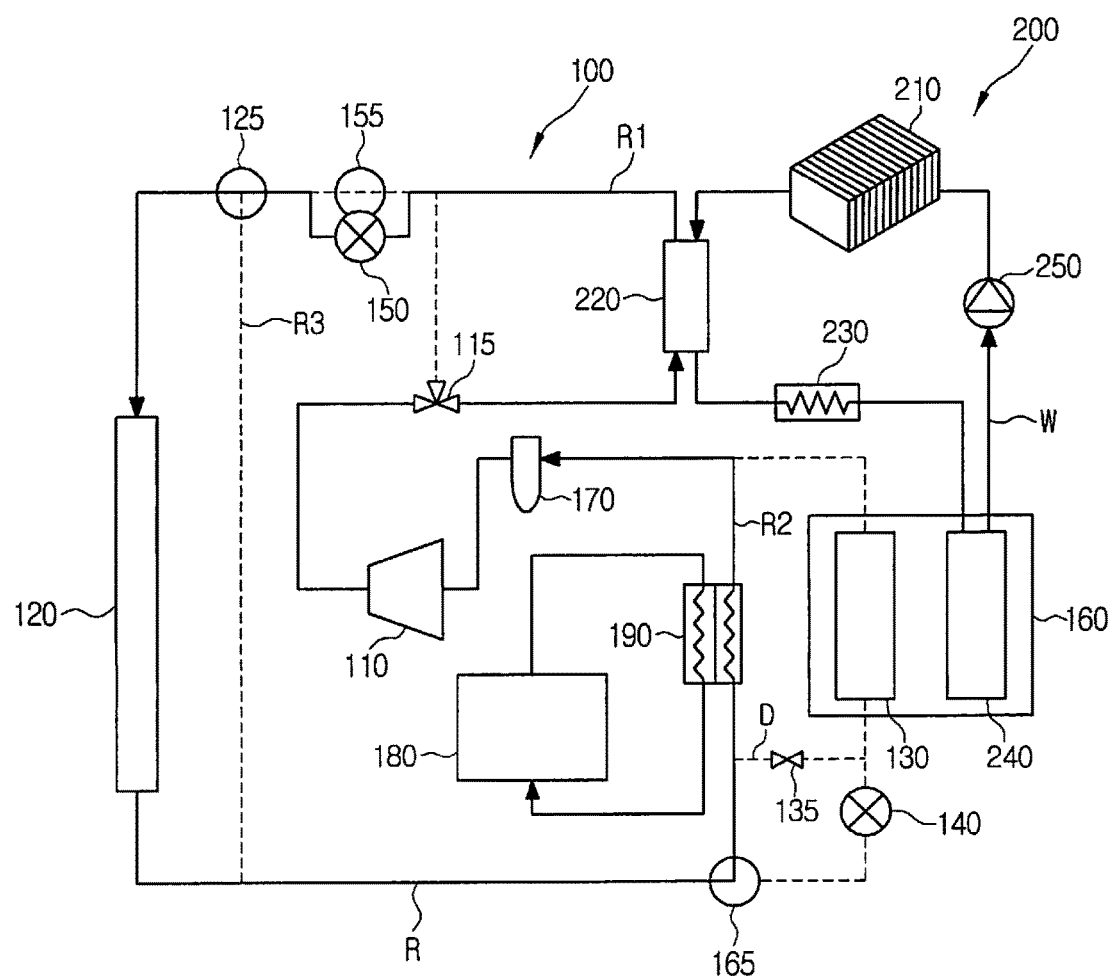
FIG. 3 is a configurative diagram showing a first heating mode of the air conditioner for a vehicle having the battery temperature control device according to the first preferred embodiment of the present invention.

FIG. 3 is a configurative diagram showing a first heating mode of the air conditioner for a vehicle having the battery temperature control device according to the preferred embodiment of the present invention. The first heating mode is an efficient heating mode when the maximum heating performance is needed.

The refrigerant passes through the compressor 110, the coolant heat exchanger 220, the second expansion means 150, the outdoor heat exchanger 120, the chiller 90 and the accumulator 170, and then, is circulated to the compressor 110. In this instance, the coolant heat exchanger 220 plays a role as a condenser and the outdoor heat exchanger 120 plays a role as an evaporator.

The refrigerant flows along the second bypass line R2 by a third valve 165 mounted on the refrigerant circulation line R after passing through the outdoor heat exchanger 130, and then, bypasses the indoor heat exchanger 130 and the first expansion means 140. The third valve 165 is formed in a three-way valve type and is opened to make the refrigerant passing through the outdoor heat exchanger 120 flow to the refrigerant circulation line R or the second bypass line R2.

In this instance, the first valve 115 and the second valve 155 open a refrigerant path so that the refrigerant can flow to the refrigerant circulation line R. Therefore, the refrigerant passing through the compressor 110 flows to the coolant heat exchanger 220, and the refrigerant passing through the coolant heat exchanger 220 flows to pass through the second expansion means 150.

Moreover, the coolant circulation line W also operates by the coolant pump 250 to heat the battery 210, and supplies heat to the interior of the vehicle by the heater core 240.

Furthermore, the coolant circulating the electronic units 180 of the vehicle also circulates, and waste heat of the electronic units 180 and the refrigerant exchange heat in the chiller 190.

Finally, the interior of the vehicle is heated, and at the same time, the battery 210 is also heated.

Figure 4:
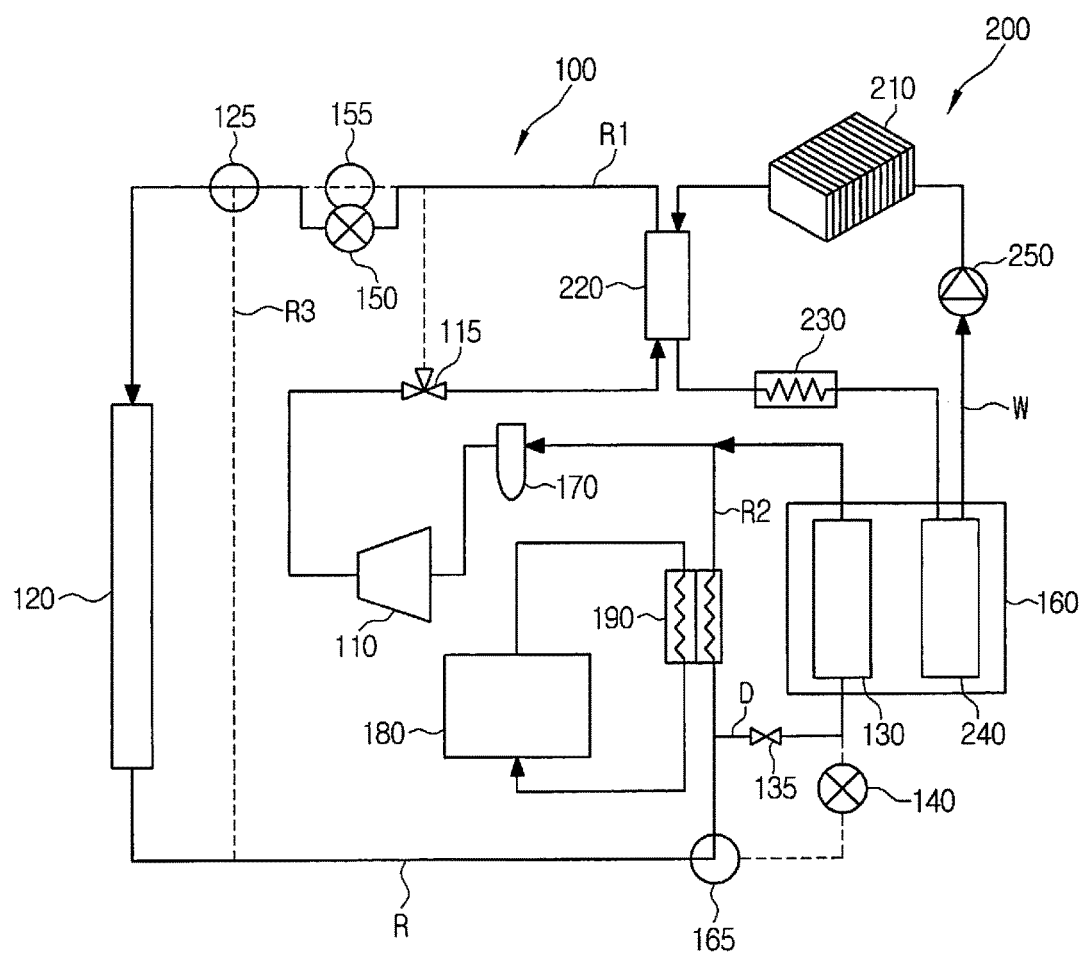
FIG. 4 is a configurative diagram showing a first heating dehumidification mode of the air conditioner having the battery temperature control device according to the first preferred embodiment of the present invention.

FIG. 4 is a configurative diagram showing a first heating dehumidification mode of the air conditioner 100 having the battery temperature control device 200 according to the preferred embodiment of the present invention. The first heating dehumidification mode is a heating mode carried out when dehumidification is needed in the first heating mode.

A fourth valve 135 is mounted to move some of the refrigerant, which is circulated to carry out the first heating mode, along the dehumidification line D. The fourth valve 135 is formed in a one-way valve type in order to make the refrigerant flow to the indoor heat exchanger 130 or to prevent that the refrigerant flows to the indoor heat exchanger 130.

Therefore, some of the refrigerant flowing from the outdoor heat exchanger 120 to the compressor 110 can flow to the indoor heat exchanger 130. In this instance, because the indoor heat exchanger 130 plays a role as an evaporator, the refrigerant passes through the evaporator to dehumidify.

Finally, the interior of the vehicle is heated and dehumidified, and at the same time, the battery is heated.

Figure 5:
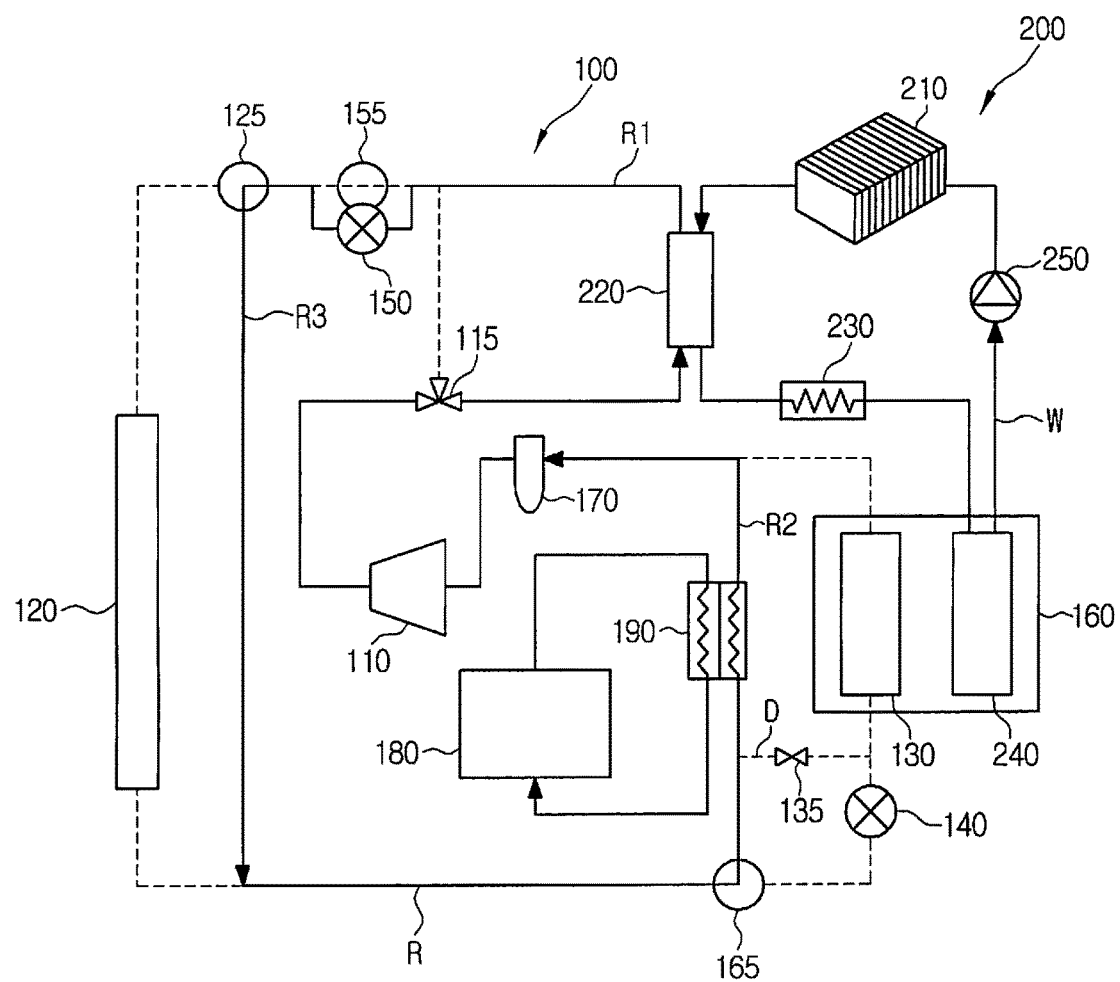
FIG. 5 is a configurative diagram showing a second heating mode of the air conditioner having the battery temperature control device according to the first preferred embodiment of the present invention.

FIG. 5 is a configurative diagram showing a second heating mode of the air conditioner 100 having the battery temperature control device 200 according to the preferred embodiment of the present invention. The second heating mode is a heating mode carried out when outdoor temperature is below a predetermined temperature or it is concerned about defrosting of the outdoor heat exchanger 120. For instance, the predetermined temperature may be below zero.

The refrigerant passes through the compressor 110, the coolant heat exchanger 220, the second expansion means 150, the chiller 190 and the accumulator 170, and then, is circulated to the compressor 110.

The refrigerant flows along the third bypass line R3 by a fifth valve 125 mounted on the refrigerant circulation line R after passing through the second expansion means 150, and then, bypasses the outdoor heat exchanger 120. The fifth valve 125 is formed in a three-way valve type and is opened to make the refrigerant passing through the second expansion means 150 flow to the refrigerant circulation line R or the third bypass line R3.

In this instance, defrosting of the outdoor heat exchanger 120 is prevented because the refrigerant does not pass through the outdoor heat exchanger 120.

Finally, the interior of the vehicle is heated, and at the same time, the battery 210 is also heated, and defrosting of the outdoor heat exchanger 120 is prevented.

Figure 6:
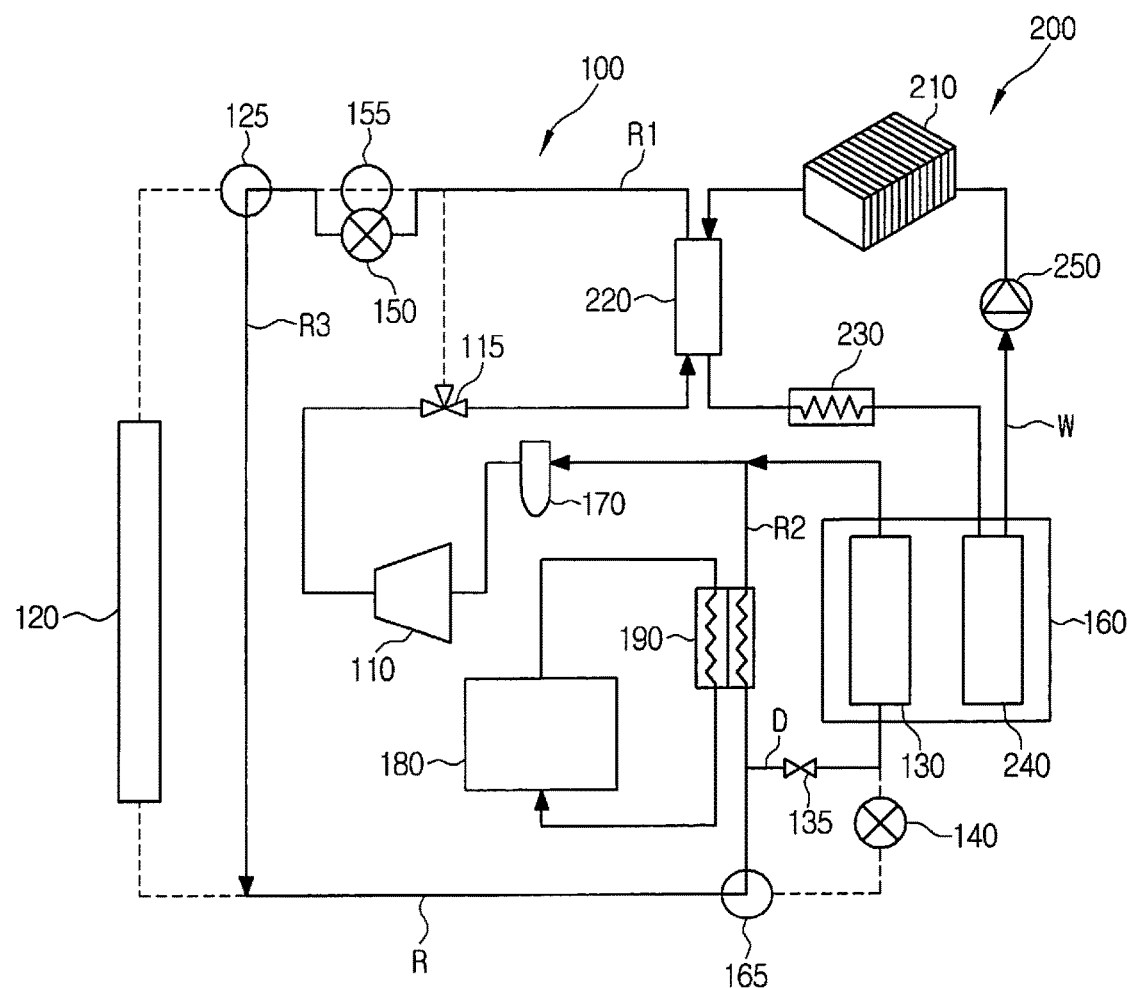
FIG. 6 is a configurative diagram showing a second heating dehumidification mode of the air conditioner having the battery temperature control device according to the first preferred embodiment of the present invention.

FIG. 6 is a configurative diagram showing a second heating dehumidification mode of the air conditioner 100 having the battery temperature control device 200 according to the preferred embodiment of the present invention. The second heating dehumidification mode is a heating mode carried out when dehumidification is needed in the second heating mode.

The third valve 165 is opened to make some of the refrigerant, which is circulated to carry out the second heating mode, along the dehumidification line D so that some of the refrigerant flows to the indoor heat exchanger 130.

Finally, the interior of the vehicle is heated and dehumidified, and at the same time, the battery is heated, and defrosting of the outdoor heat exchanger is prevented.

Moreover, the air conditioner 100 for a vehicle may further include a control unit (not shown) which controls the coolant to circulate along the coolant circulation line W when the interior of the vehicle is below a predetermined temperature or the battery 210 is below a predetermined temperature.

The control unit (not shown) can circulate the refrigerant and the coolant under various conditions.

Referring to FIGS. 7 to 11, an air conditioner 100 for a vehicle according to another preferred embodiment of the present invention includes a battery temperature control device 200 for a vehicle, and is applicable to vehicles of all kinds, such as hybrid vehicles, electric cars and vehicles using high-capacity batteries.

The air conditioner 100 for a vehicle is an apparatus for cooling or heating the interior of the vehicle, and the battery temperature control device 200 for a vehicle heats a battery 210 using refrigerant which circulates along a refrigerant circulation line R of the air conditioner 100 for a vehicle. A compressor 110, an outdoor heat exchanger 120, an indoor heat exchanger 130 and expansion means 140 and 150 are mounted in the refrigerant circulation line R.

Furthermore, a coolant heat exchanger 220 which exchanges heat between the refrigerant and coolant circulating a coolant circulation line W is mounted on the refrigerant circulation line R. The coolant heat exchanger 220 is mounted on the refrigerant circulation line R and the coolant circulation line W to exchange heat between the refrigerant and the coolant. The coolant heat exchanger 220 may have one of various forms to exchange heat between the refrigerant and the coolant.

Additionally, a first bypass line R1 is formed to bypass the second expansion means 150. The first bypass line R1 is connected with the refrigerant circulation line R in parallel, and makes the refrigerant bypass the coolant heat exchanger 220 and the second expansion means 150 using a valve. Therefore, the refrigerant circulates the compressor 110, the outdoor heat exchanger 120, the first expansion means 140 and the indoor heat exchanger 130 in order.

In addition, a second bypass line R2 is formed to bypass the first expansion means 140 and the indoor heat exchanger 130. The second bypass line R2 is connected in parallel with the refrigerant circulation line R and allows the refrigerant to bypass the first expansion means 140 and the indoor heat exchanger 130 by a valve. Therefore, the refrigerant circulates the compressor 110, the coolant heat exchanger 220, the second expansion means 150 and the outdoor heat exchanger 120 in order.

Moreover, a chiller 190 which heat-exchanges waste heat supplied from electronic units 180 of the vehicle is mounted on the second bypass line R2. The chiller 190 is configured to exchange heat between the coolant, which circulates the electronic units 180 of the vehicle, and the refrigerant. Furthermore, a dehumidification line D may be further formed to supply some of the refrigerant circulating the refrigerant circulation line R to the indoor heat exchanger 130. Accordingly, some of the refrigerant may be supplied to the indoor heat exchanger 130 through the dehumidification line D using a valve.

Additionally, a third bypass line R3 may be further formed so that the refrigerant passing through the second expansion means 150 bypasses the outdoor heat exchanger 120. The third bypass line R3 is connected with the refrigerant circulation line R in parallel, and a valve is connected to the third bypass line R3 to allow the refrigerant to bypass the outdoor heat exchanger 120. A heater core 240, a coolant heater 230 and a coolant pump 250 are disposed on the coolant circulation line W on which the coolant heat exchanger 220 is mounted.

The coolant heat exchanger 220, the coolant heater 230, the heater core 240 and the coolant pump 250 may be arranged on the coolant circulation line W in order. Therefore, the coolant circulates along the coolant circulation line W while passing through the coolant heat exchanger 220, the coolant heater 230, the heater core 240 and the coolant pump 250. In this instance, the coolant heat exchanger 220 is mounted to exchange heat between the refrigerant discharged from the compressor 110 and the coolant passing through the battery 210.

The coolant heater 230 is mounted to heat the coolant using electricity. The heater core 250 is mounted inside the air-conditioning case 160 to heat the interior of the vehicle. That is, the coolant heater 230 is mounted inside the air-conditioning case 160 together with the indoor heat exchanger 130. The coolant pump 250 is mounted to circulate the coolant along the coolant circulation line W. In this instance, the coolant is heat-exchanged with refrigerant of high temperature in the coolant heat exchanger 220 and is additionally heated by the coolant heater 230, and the heater core 240 supplies heat to the interior of the vehicle through such heated coolant.

The battery 210 is connected to the coolant circulation line W, and preferably, is connected with the heater core 240 in parallel. Additionally, a coolant valve 310 is formed to make the coolant circulating the coolant circulation line W flow to at least one of the battery 210 and the heater core 240. That is, the coolant can flow to the heater core 240 or the battery 210 by the coolant valve 310.

The reason is to selectively carry out heating of the battery 210 and heating of the interior of the vehicle if it is necessary to heat the battery 210 and/or the interior of the vehicle. For instance, if the indoor temperature of the vehicle is so low as to need heating of the vehicle but the battery 210 is heated sufficiently, the coolant flows only to the heater core 240 and bypasses the battery 210 by the coolant valve 310.

Moreover, if there is no need to heat the interior of the vehicle but it is necessary to heat the battery 210, the coolant flows only to the battery 210. FIGS. 8 to 11 illustrate a heating mode to carry out both of heating of the interior of the vehicle and heating of the battery 210. If the battery 210 is below a predetermined temperature, a control unit may be further included to control the coolant valve 310 to make the coolant flow to the battery 210. The control unit controls the coolant pump 250 to control the flow of the coolant. Furthermore, a reservoir tank 320 is mounted on the coolant circulation line W to remove unnecessary air in the coolant circulation line W.

FIGS. 7 to 11 show various cooling and heating modes of the air conditioner 100 for a vehicle, but they are exemplary and other various forms of the cooling and heating modes of the air conditioner 100 are possible. In the drawings, parts indicated by solid lines are lines where refrigerant and coolant are circulated, and parts indicated by dotted lines are lines where refrigerant and coolant are not circulated.

Figure 7:
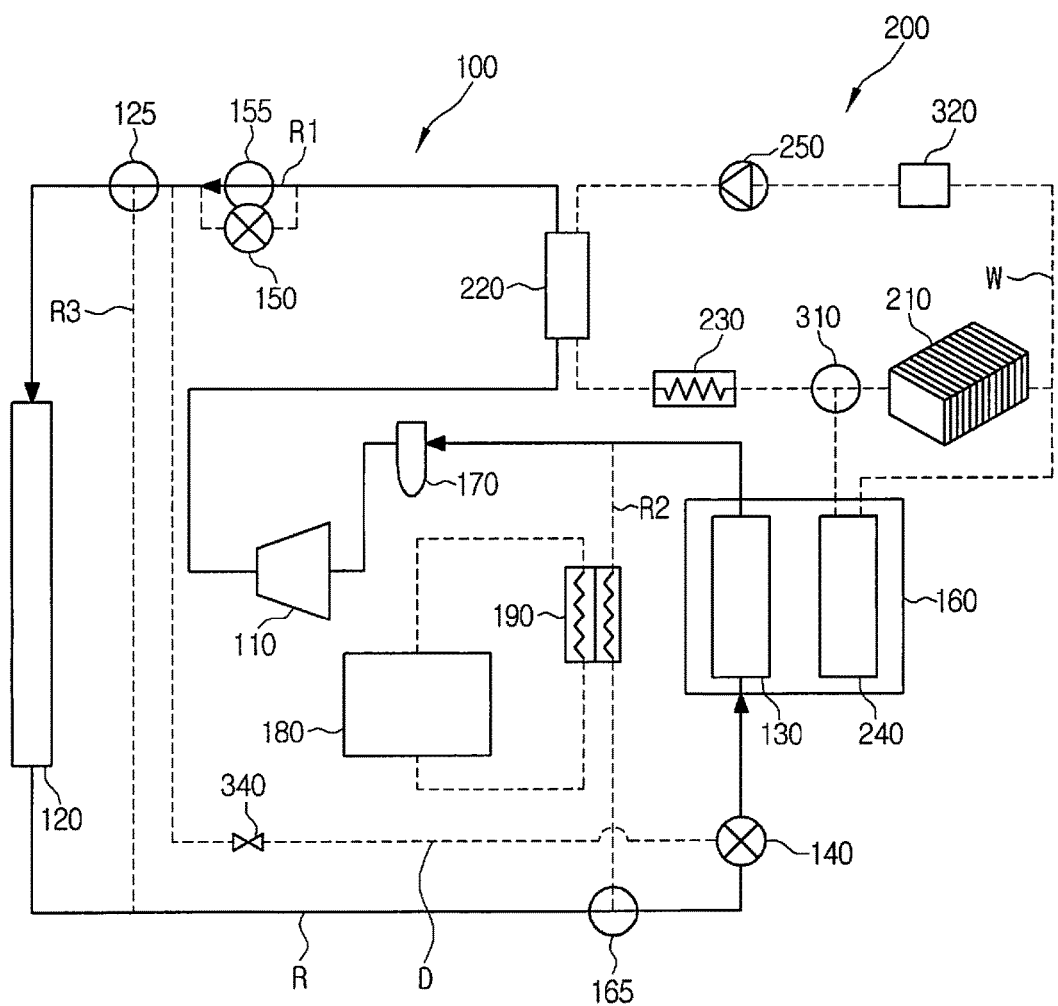
FIG. 7 is a configurative diagram showing a cooling mode of an air conditioner for a vehicle having a battery temperature control device for a vehicle according to a second preferred embodiment of the present invention.

FIG. 7 is a configurative diagram showing a cooling mode of the air conditioner 100 for a vehicle having the battery temperature control device 200 for a vehicle according to the preferred embodiment of the present invention. The refrigerant passes through the compressor 110, the coolant heat exchanger 220, the outdoor heat exchanger 120, the first expansion means 140, the indoor heat exchanger 130 and the accumulator 170, and then, is circulated to the compressor 110. In this instance, because the coolant heat exchanger 220 and the outdoor heat exchanger 120 play a role as a condenser and the indoor heat exchanger 130 plays a role as an evaporator, the indoor heat exchanger 130 exchanges heat with the inside air of the air-conditioning case 160 to supply cold air to the interior of the vehicle.

In this instance, the refrigerant flows along the first bypass line R1 by a first valve 155 mounted on the refrigerant circulation line R after passing through the compressor 110, and then, bypasses the coolant heat exchanger 220. The first valve 155 is formed in a two-way valve type and is opened to make the refrigerant pass through or bypass the second expansion means 150. Finally, the interior of the vehicle is cooled and the battery is not heated because the coolant circulation line W does not operate.

Figure 8:
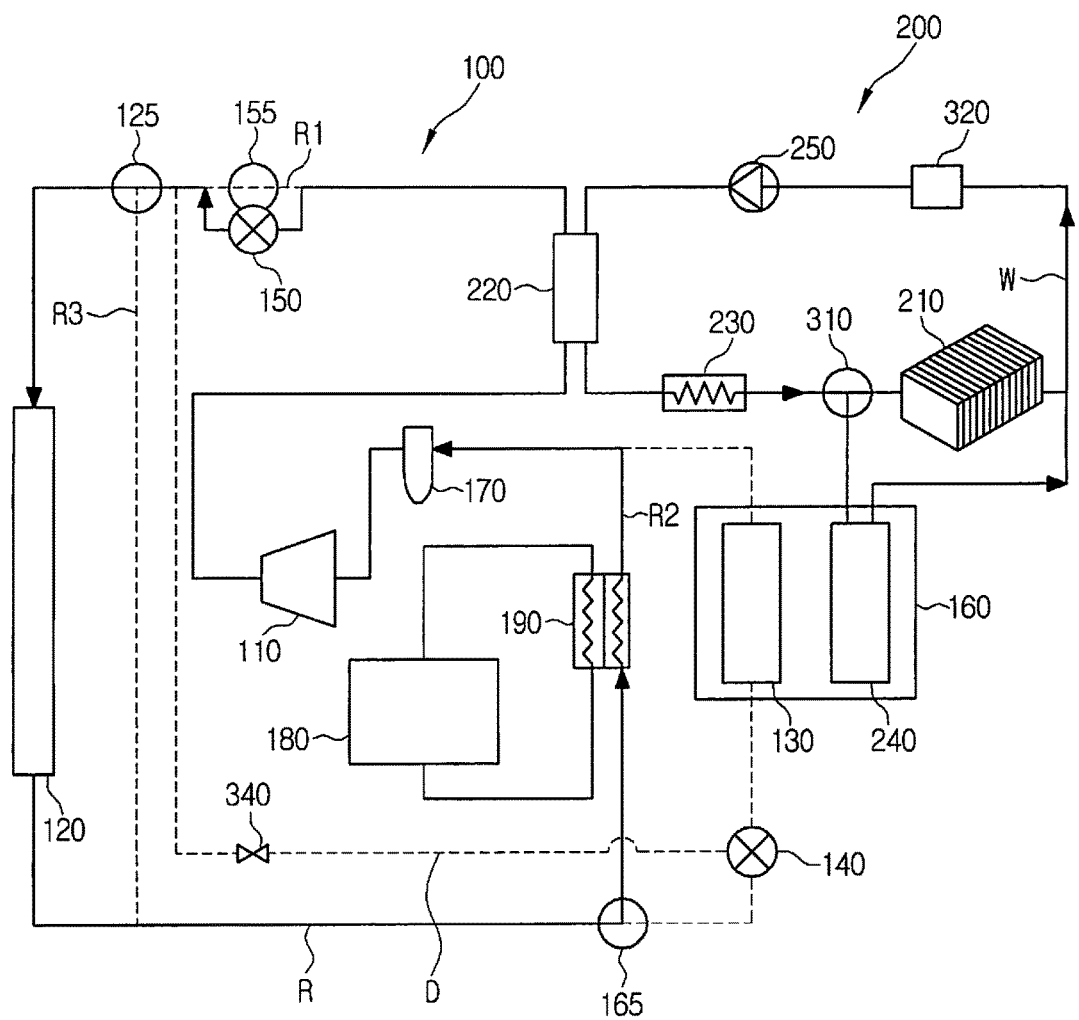
FIG. 8 is a configurative diagram showing a first heating mode of the air conditioner for a vehicle having the battery temperature control device according to the second preferred embodiment of the present invention.

FIG. 8 is a configurative diagram showing a first heating mode of the air conditioner 100 for a vehicle having the battery temperature control device 200 according to the preferred embodiment of the present invention. The first heating mode is an efficient heating mode when the maximum heating performance is needed. The refrigerant passes through the compressor 110, the coolant heat exchanger 220, the second expansion means 150, the outdoor heat exchanger 120, the chiller 90 and the accumulator 170, and then, is circulated to the compressor 110. In this instance, the coolant heat exchanger 220 plays a role as a condenser and the outdoor heat exchanger 120 plays a role as an evaporator.

The refrigerant flows along the second bypass line R2 by a second valve 165 mounted on the refrigerant circulation line R after passing through the outdoor heat exchanger 130, and then, bypasses the indoor heat exchanger 130 and the first expansion means 140. The second valve 165 is formed in a three-way valve type and is opened to make the refrigerant passing through the outdoor heat exchanger 120 flow to the refrigerant circulation line R or the second bypass line R2. In this instance, the first valve 155 opens a refrigerant path so that the refrigerant can flow to the refrigerant circulation line R. Therefore, the refrigerant passing through the compressor 110 flows to the coolant heat exchanger 220, and the refrigerant passing through the coolant heat exchanger 220 flows to pass through the second expansion means 150.

Moreover, the coolant circulation line W also operates by the coolant pump 250 to heat the battery 210, and supplies heat to the interior of the vehicle by the heater core 240. That is, the coolant valve 310 makes the coolant flow to the battery 210 and the heater core 240. As described above, if necessary, the coolant valve 310 can make the coolant flow to the battery 210 or the heater core 240. In addition, the coolant circulating the electronic units 180 of the vehicle also circulates so that the waste heat of the electronic units and the refrigerant exchange heat with each other in the chiller 190.

Finally, the interior of the vehicle is heated, and at the same time, the battery 210 is also heated. In this instance, if the battery 210 is above a predetermined temperature, the coolant valve 310 can prevent the flow of the coolant which flows to the battery 210. Therefore, if the battery 210 is below a predetermined temperature, the coolant valve 310 can make the coolant flow to the battery 210 again.

Figure 9:
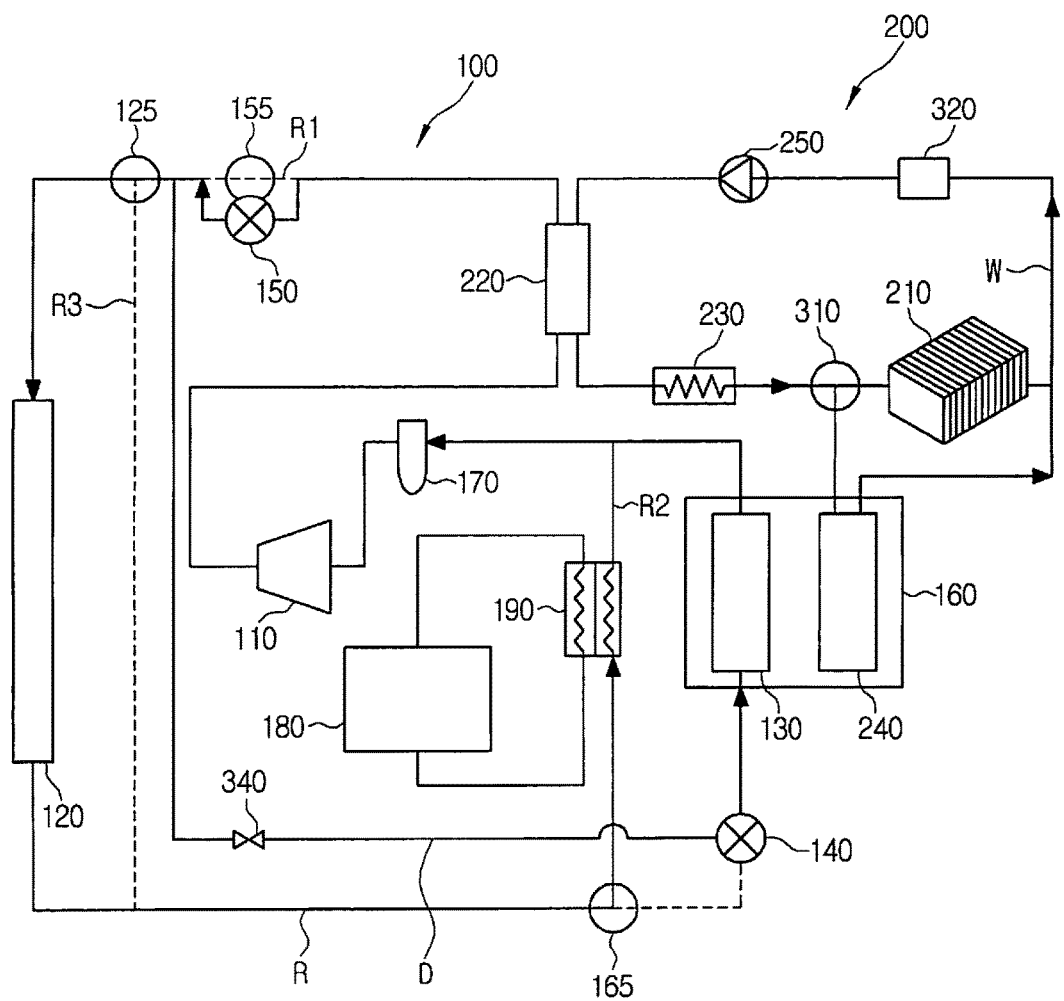
FIG. 9 is a configurative diagram showing a first heating dehumidification mode of the air conditioner having the battery temperature control device according to the second preferred embodiment of the present invention.

FIG. 9 is a configurative diagram showing a first heating dehumidification mode of the air conditioner 100 having the battery temperature control device 200 according to the preferred embodiment of the present invention. The first heating dehumidification mode is a heating mode carried out when dehumidification is needed in the first heating mode. A third valve 340 is mounted to move some of the refrigerant, which is circulated to carry out the first heating mode, along the dehumidification line D. The third valve 340 is formed in a one-way valve type in order to make the refrigerant flow to the indoor heat exchanger 130 or to prevent that the refrigerant flows to the indoor heat exchanger 130.

Therefore, some of the refrigerant flowing from the outdoor heat exchanger 120 to the compressor 110 can flow to the indoor heat exchanger 130. That is, some of the refrigerant passing through the second expansion means 150 flows to the outdoor heat exchanger 120, and the remaining refrigerant flows into the indoor heat exchanger 130. Finally, the interior of the vehicle is heated and dehumidified, and at the same time, the battery is heated.

Figure 10:
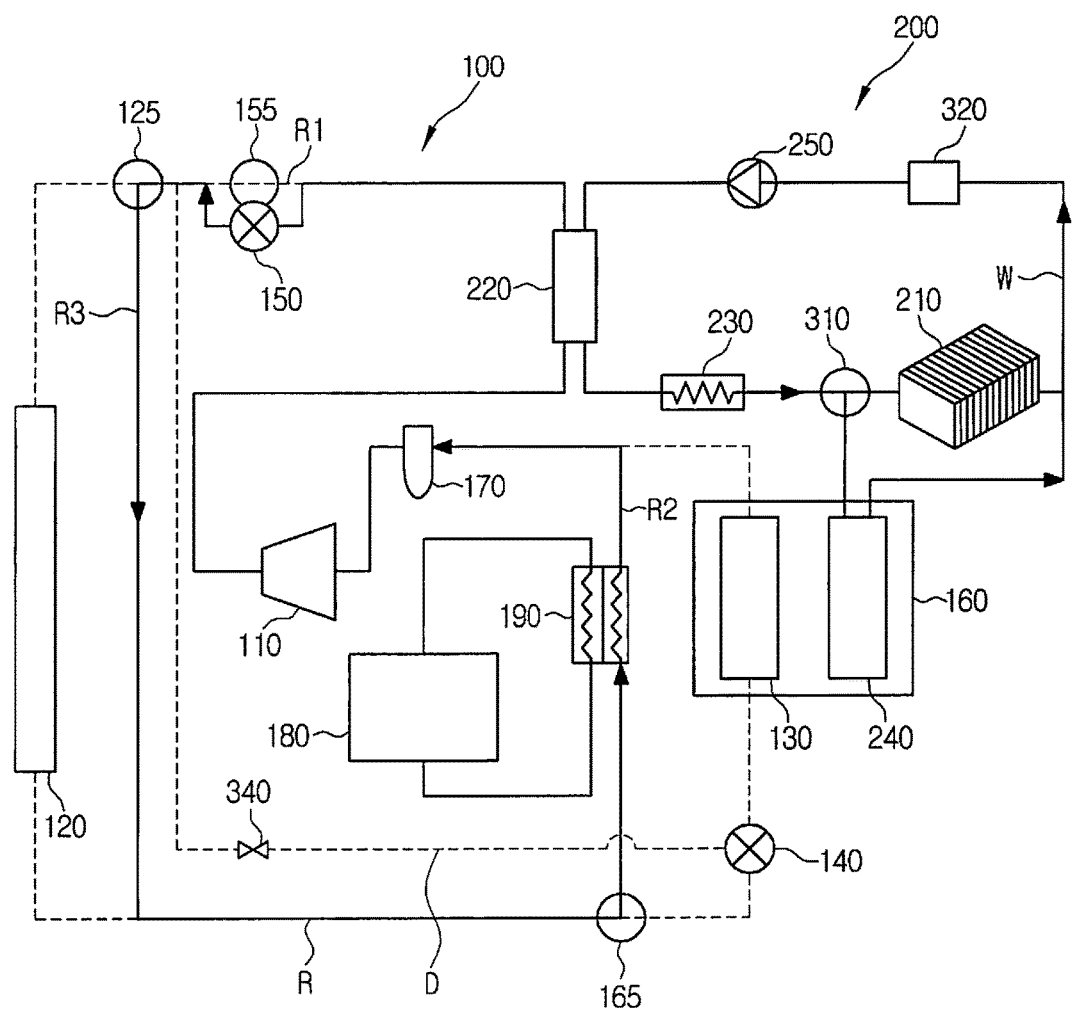
FIG. 10 is a configurative diagram showing a second heating mode of the air conditioner having the battery temperature control device according to the second preferred embodiment of the present invention.

FIG. 10 is a configurative diagram showing a second heating mode of the air conditioner 100 having the battery temperature control device 200 according to the preferred embodiment of the present invention. The second heating mode is a heating mode carried out when outdoor temperature is below a predetermined temperature or it is concerned about defrosting of the outdoor heat exchanger 120. For instance, the predetermined temperature may be below zero. The refrigerant passes through the compressor 110, the coolant heat exchanger 220, the second expansion means 150, the chiller 190 and the accumulator 170, and then, is circulated to the compressor 110.

The refrigerant flows along the third bypass line R3 by a fourth valve 125 mounted on the refrigerant circulation line R after passing through the second expansion means 150, and then, bypasses the outdoor heat exchanger 120. The fourth valve 125 is formed in a three-way valve type and is opened to make the refrigerant passing through the second expansion means 150 flow to the refrigerant circulation line R or the third bypass line R3. In this instance, defrosting of the outdoor heat exchanger 120 is prevented because the refrigerant does not pass through the outdoor heat exchanger 120. Finally, the interior of the vehicle is heated, and at the same time, the battery 210 is also heated, and defrosting of the outdoor heat exchanger 120 is prevented.

Figure 11:
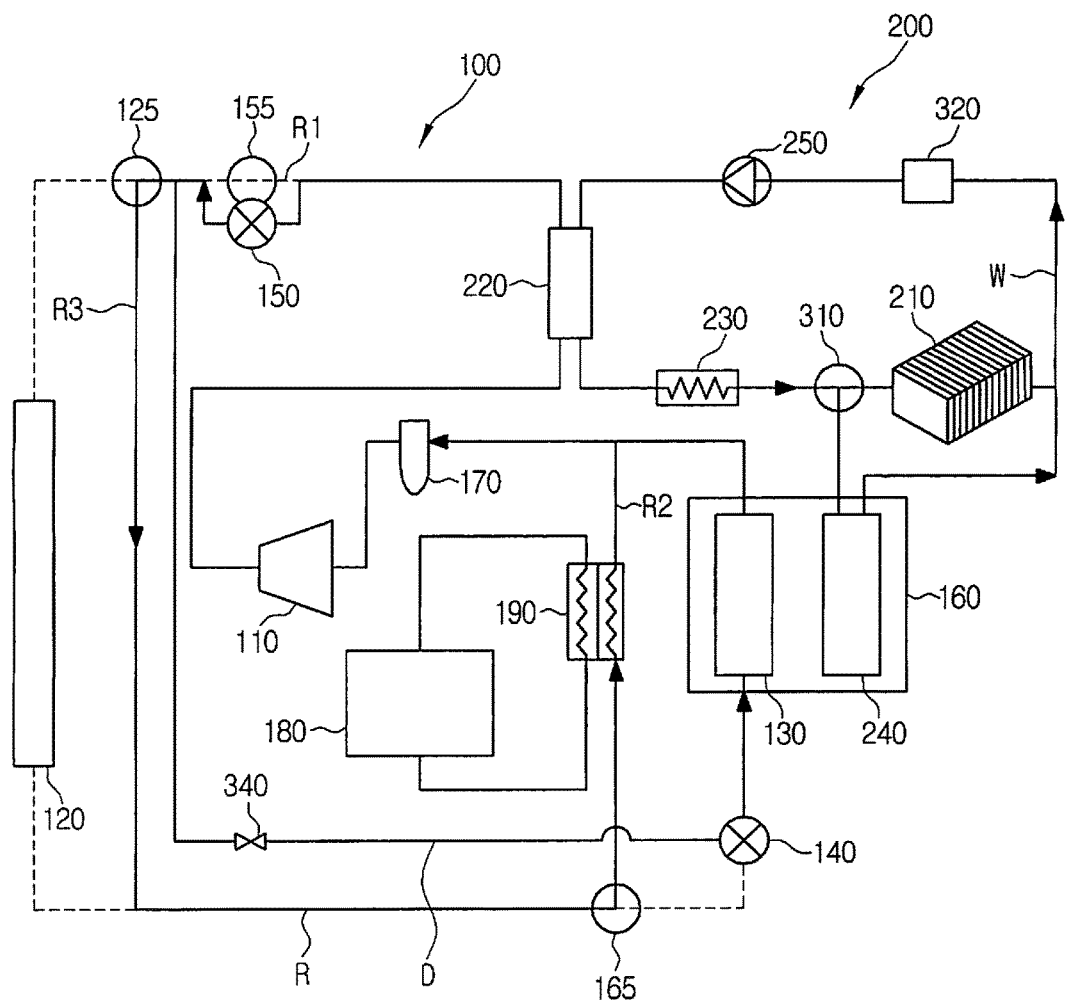
FIG. 11 is a configurative diagram showing a second heating dehumidification mode of the air conditioner having the battery temperature control device according to the second preferred embodiment of the present invention.

FIG. 11 is a configurative diagram showing a second heating dehumidification mode of the air conditioner 100 having the battery temperature control device 200 according to the preferred embodiment of the present invention. The second heating dehumidification mode is a heating mode carried out when dehumidification is needed in the second heating mode. Some of the refrigerant flows to the indoor heat exchanger 130 so that some of the refrigerant, which circulates to carry out the second heating mode, flows along the dehumidification line D. Finally, the interior of the vehicle is heated and dehumidified, and at the same time, the battery is heated, and defrosting of the outdoor heat exchanger is prevented.

While the present invention has been described with reference to the particular illustrative embodiments, the present invention is not to be restricted by the embodiments. It is to be appreciated that those skilled in the art can change or modify the embodiments without departing from the technical scope and spirit of the present invention described in the following claims.

What is claimed is:

1. A battery temperature control device for a vehicle comprising:
    a refrigerant circulation line (R) having a compressor, an indoor heat exchanger, expansion means and an outdoor heat exchanger;
    a coolant circulation line (W) which circulates through a heater core mounted to heat the interior of the vehicle;
    a coolant heat exchanger mounted to exchange heat between refrigerant circulating the refrigerant circulation line (R) and coolant circulating the coolant circulation line (W); and
    a battery is arranged on the coolant circulation line (W).

2. The battery temperature control device according to claim 1, further comprising:
    a coolant heater mounted on the coolant circulation line (W) to heat the coolant using electricity; and
    a coolant pump mounted on the coolant circulation line (W) to circulate the coolant.

3. The battery temperature control device according to claim 2, wherein the coolant heat exchanger, the coolant heater, the heater core and the coolant pump are mounted on the coolant circulation line (W) in order.

4. The battery temperature control device according to claim 2, wherein the battery is arranged between the coolant heat exchanger and the coolant pump.

5. The battery temperature control device according to claim 2, further comprising:
    a control unit which controls the coolant pump to operate if the battery is below a predetermined temperature.

6. The battery temperature control device according to claim 1, wherein the coolant heat exchanger is mounted to exchange heat between the refrigerant discharged from the compressor and the coolant circulating the coolant circulation line (W).

7. The battery temperature control device according to claim 1, wherein the coolant heat exchanger is mounted to exchange heat between the refrigerant discharged from the compressor and the coolant passing through the battery.

8. The battery temperature control device according to claim 1, wherein heater core is mounted in an air-conditioning case together with the indoor heat exchanger.

9. The battery temperature control device according to claim 1, wherein the battery is connected to the coolant circulation line (W) in parallel.

10. The battery temperature control device according to claim 9, wherein the battery is connected to the coolant circulation line (W) in parallel with the heater core.

11. The battery temperature control device according to claim 10, further comprising: a coolant valve which makes the coolant circulating the coolant circulation line (W) flow to at least one of the battery or the heater core.

12. The battery temperature control device according to claim 11, further comprising:
    a control unit which controls the coolant valve so that the coolant flows to the battery if the battery is below a predetermined temperature.

* * * * *